United States Patent
Cohen et al.

(10) Patent No.: US 9,933,957 B1
(45) Date of Patent: Apr. 3, 2018

(54) NON-DISRUPTIVELY MIGRATING VIRTUAL DISKS USING VIRTUALIZATION APPLIANCE

(71) Applicant: EMC IP Holding Company LLC, Hopkinton, MA (US)

(72) Inventors: Saar Cohen, Mishmeret (IL); Assaf Natanzon, Tel Aviv (IL); David L. Black, Acton, MA (US); Erin Bournival, Bedford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 14/984,219

(22) Filed: Dec. 30, 2015

(51) Int. Cl.
*G06F 3/06* (2006.01)

(52) U.S. Cl.
CPC .......... *G06F 3/0619* (2013.01); *G06F 3/0647* (2013.01); *G06F 3/0665* (2013.01); *G06F 3/0685* (2013.01); *G06F 3/0689* (2013.01)

(58) Field of Classification Search
CPC .... G06F 3/0607; G06F 3/0619; G06F 3/0647; G06F 3/065; G06F 3/0665; G06F 3/0683; G06F 3/0685; G06F 3/0689

USPC .............................. 711/6, 114, 165, 202, 203
See application file for complete search history.

(56) References Cited

U.S. PATENT DOCUMENTS

| | | | |
|---|---|---|---|
| 8,554,981 B2 | 10/2013 | Schmidt et al. | |
| 8,694,828 B2 | 4/2014 | Nelson et al. | |
| 9,430,480 B1 | 8/2016 | Bono | |
| 9,454,326 B1 | 9/2016 | Bono et al. | |
| 2007/0204265 A1* | 8/2007 | Oshins | G06F 9/4856 718/1 |
| 2013/0054813 A1* | 2/2013 | Bercovici | G06F 9/45533 709/226 |
| 2014/0019621 A1* | 1/2014 | Khan | G06F 9/4856 709/226 |

\* cited by examiner

*Primary Examiner* — Gary Portka
(74) *Attorney, Agent, or Firm* — BainwoodHuang

(57) ABSTRACT

A technique for migrating data of a virtual machine running on a server from a first storage array to a second storage array includes configuring a virtualization appliance to mirror data between the first storage array and the second storage array and redirecting IO (Input/Output) requests, which were previously directed to the first storage array, instead to the virtualization appliance. The virtualization appliance performs data mirroring to bring the data in the second storage array into synchronization with the data in the first storage array, such that migration of the data from the first storage array to the second storage array is achieved.

21 Claims, 8 Drawing Sheets

NON-DISRUPTIVELY MIGRATING VIRTUAL DISKS USING VIRTUALIZATION APPLIANCE

BACKGROUND

Virtual machines are software-based instances of computing devices that run on computing servers. A computing server may run numerous virtual machines, depending upon the hardware capacity of the server. The server may run a hypervisor, which manages the virtual machines on the server and acts as an interface between the virtual machines and the server's hardware.

In some deployments, virtual machine servers connect to external storage arrays to access virtual machine disks and/or other virtual machine data. For example, a virtual machine server may connect to a storage array, e.g., over a SAN (Storage Area Network), LAN (Local Area Network), and/or other network or connection. The storage array efficiently stores the data of the virtual machines, including their boot drives, data drives, and so forth, while the virtual machine server provides memory and processing resources to run the virtual machines. To access virtual machine data from an array, the virtual machines running on the server issue IO (Input/Output) requests to the array. The IO requests specify reads and writes of data on the array for the respective virtual machines. The array processes the IO requests to effect the specified reads and writes, with reads causing the array to return the requested data to the requesting virtual machines. For optimal performance, the virtual machine server and the array may be located in close proximity to each other, e.g., in a single data center.

Virtual machine servers commonly support migration of virtual machine data. For example, a new storage array may become available that provides faster performance than an array currently being used. An administrator may implement migration by operating a management console, specifying source and target arrays, and directing a virtual machine server to migrate the virtual machine's data from source to target. Migration may proceed non-disruptively, i.e., without requiring service interruption, using techniques known in the art as "live migration."

SUMMARY

Unfortunately, conventional techniques for performing live migration of virtual machine data can be burdensome to virtual machine servers. For example, in a conventional scheme, a virtual machine server does the work of physically copying the data of a virtual machine from a source array to a target array. Such server-based migration may be resource intensive, consuming processing, memory, and network resources of the virtual machine server. Performance of virtual machines may tend to suffer if the server becomes highly burdened with migration activities.

In contrast with the prior approach, an improved technique for migrating data of a virtual machine from a first storage array to a second storage array includes configuring a virtualization appliance to mirror data between the first storage array and the second storage array and redirecting IO (Input/Output) requests, which were previously directed to the first storage array, to the virtualization appliance instead. The virtualization appliance performs data mirroring to bring the data in the second storage array into synchronization with the data in the first storage array, such that migration of the data from the first storage array to the second storage array is achieved. In this fashion, the burden of transferring data is shifted from the server to the virtualization appliance and the arrays, thus freeing the server's resources for running virtual machines while more effectively utilizing the capabilities of the appliance and the arrays.

In some examples, the improved technique further includes redirecting IO requests, which are directed to the virtualization appliance, to the second storage array, such that data of the virtual machine may be accessed directly from the second storage array. The first storage array and/or the virtualization appliance may then optionally be disabled or removed.

In some examples, the virtual machine server, or an infrastructure of which the virtual machine server is a part, controls and orchestrates the migration via a control path to the arrays and to the virtualization appliance.

In some examples, the virtualization appliance is provided as one or more hardware units distinct from the storage arrays and from the virtual machine server. In other examples, the virtualization appliance is provided in the form of software components, with one or more components running in the first storage array and one or more components running in the second storage array. The virtualization appliance may further be provided as software components that run within virtual machines. Hardware and the various software implementations may be used in combination in any suitable way.

Certain embodiments are directed to a method of migrating virtual disks between storage arrays. The method includes directing, by a server that runs a virtual machine, IO (Input/Output) requests issued by the virtual machine to a virtual disk in a first storage array, the virtual disk storing data of the virtual machine and the IO requests specifying reads and writes of the virtual disk. The method further includes configuring a virtualization appliance to present an image of the virtual disk to the server and to synchronize two background versions of the virtual disk, the two background versions including the virtual disk in the first storage array and another virtual disk in a second storage array. After configuring the virtualization appliance, the method still further includes redirecting, by the server, IO requests issued by the virtual machine to the image of the virtual disk in the virtualization appliance, the virtualization appliance thereby synchronizing the two background versions of the virtual disk to effect migration of the virtual disk from the first storage array to the second storage array.

Other embodiments are directed to an apparatus constructed and arranged to perform a method of migrating virtual disks between storage arrays, such as the method described above. Still other embodiments are directed to a computer program product. The computer program product stores instructions which, when executed by control circuitry, cause the control circuitry to perform a method of migrating virtual disks between storage arrays, such as the method described above. Some embodiments involve activity that is performed at a single location, while other embodiments involve activity that is distributed over a computerized environment (e.g., over a network).

The foregoing summary is presented for illustrative purposes to assist the reader in readily understanding example features presented herein and is not intended to be limiting in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for migrating data of a virtual machine running on a server from a first storage array to a second storage array includes configuring a virtualization appliance to mirror data between the first storage array and the second storage array and redirecting IO (Input/Output) requests, which were previously directed to the first storage array, instead to the virtualization appliance. The virtualization appliance performs data mirroring to bring the data in the second storage array into synchronization with the data in the first storage array, such that migration of the data from the first storage array to the second storage array is achieved.

Figure 1:
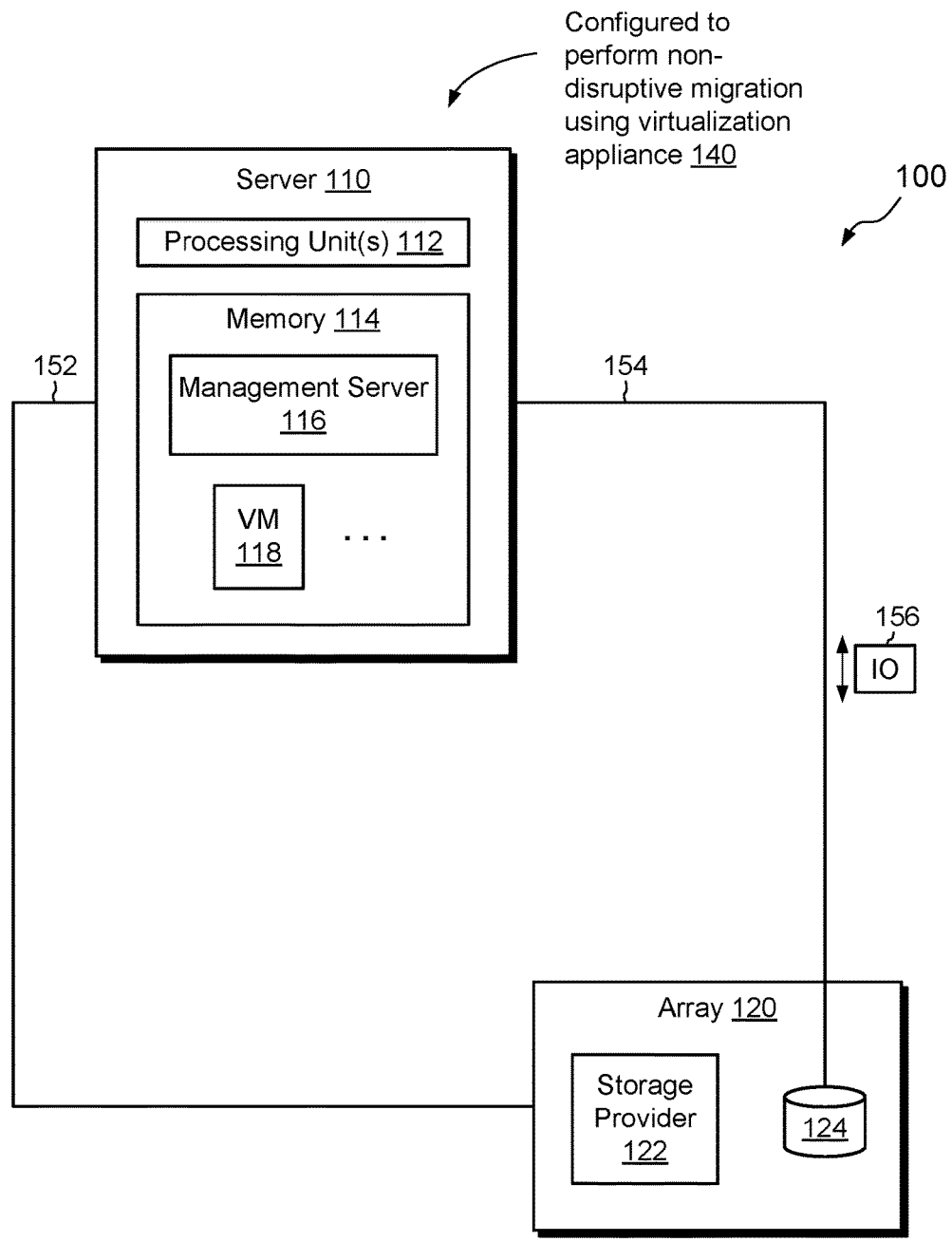
FIG. 1 is a block diagram of an example environment in which embodiments of the improved technique hereof can be practiced.

FIG. 1 shows an example environment 100 in which embodiments of the improved technique hereof can be practiced. Here, a virtual machine server 110 is coupled to an array 120 through paths 152 and 154, where path 152 is a control path and path 154 is a data path. The control path 152 and data path 154 may be realized using any number of physical cables or connections, including a single cable or connection. Also, although no network is shown, it should be understood that the control path 152 and/or data path 154 may be realized using a network, such as a SAN (Storage Area Network), LAN (Local Area Network), WAN (Wide Area Network), and/or some other network or combination of networks.

The server 110 includes processing units 112, e.g., one or more processing chips, cores, or assemblies, and memory 114. The memory 114 may include both volatile memory (e.g., RAM), and non-volatile memory, such as one or more ROMs, disk drives, solid state drives, and the like. The set of processing units 112 and the memory 114 together form control circuitry, which is constructed and arranged to carry out various methods and functions as described herein. Also, the memory 114 includes a variety of software constructs realized in the form of executable instructions. When the executable instructions are run by the set of processing units 112, the set of processing units 112 are caused to carry out the operations of the software constructs. Although certain software constructs are specifically shown and described, it is understood that the memory 114 typically includes many other software constructs, which are not shown, such as a hypervisor, various applications, processes, and daemons.

As further shown in FIG. 1, the memory 114 of the server 110 includes, i.e., realizes by operation of executable instructions, a management server 116 and one or more virtual machines (VMs) 118. The server 110 may operate any number of VMs. In an example, the management server 116 manages lifecycles of the VMs, such as their creation, destruction, and movement between servers. Although a single server 110 is shown, it should be understood that the server 110 may be one of multiple servers, all of which may be administered by the management server 116. Further, in some examples, the management server 116 may be operated from a different physical server, and may itself be run within a virtual machine.

As still further shown in FIG. 1, the array 120 includes a storage provider 122 and a virtual disk 124. The storage provider 122 provides a set of APIs (Application Program Interfaces) that recognize the capabilities of the array 120 and communicate those capabilities to the server 110 and management server 116 over the control path 152. In some examples, the virtual disk 124 is part of a pool (not shown) of multiple virtual disks. The storage provider 122 recognizes the virtual disks in the pool and communicates information about them to the server 110 and management server 116.

The virtual disk 124 stores data of the VM 118. FIG. 1 shows only a single virtual disk 124 of VM 118 for simplicity, but is should be understood that the array 120 may include any number of virtual disks of the VM 118 and of other VMs. In a particular non-limiting example, the virtual disk 124 may provide a bootable drive of VM 118. When VM 118 is booted on the server 110, the server 110 accesses the virtual disk 124 to obtain executable instructions and data required for booting. The array 120 may also store data disks of VM 118, e.g., for application data, as well as disks that provide configuration information and/or swap space, for example.

In an example, the array 120 implements the virtual disk 124 as a distinct, server-accessible data object. Thus, for example, rather than storing a virtual disk alongside other data objects in a LUN (Logical UNit) and/or in a file system, which a server must access first in order to reach the virtual disk, the virtual disk 124 is instead provided as a distinct entity, which the server 110 may access directly without traversing any containing structure. Non-limiting examples of such virtual disks include virtual volumes (i.e., "VVols"), which are available from VMware, Inc. of Palo Alto, Calif.

In example operation, the server 110 runs the VM 118, e.g., on behalf of one or more users (not shown) of the VM 118. As the VM 118 runs, the VM 118 directs IO requests 156 to the array 120 to effect read and/or write operations on the virtual disk 124. For example, the VM 118 may issue IO requests to read or write operating system data or other types of data of the virtual disk 124. The IO requests 156 are conveyed from the server 110 to the array 120 via the data path 154 and may be processed by an IO stack within the array 120.

At some point during such operation, an administrator may wish to migrate the virtual disk 124 to a different array. For example, a newer array may be available, which provides faster, more reliable storage. Other reasons for performing migration may include load balancing and/or movement of data to a different storage tier, for example.

Figure 2:
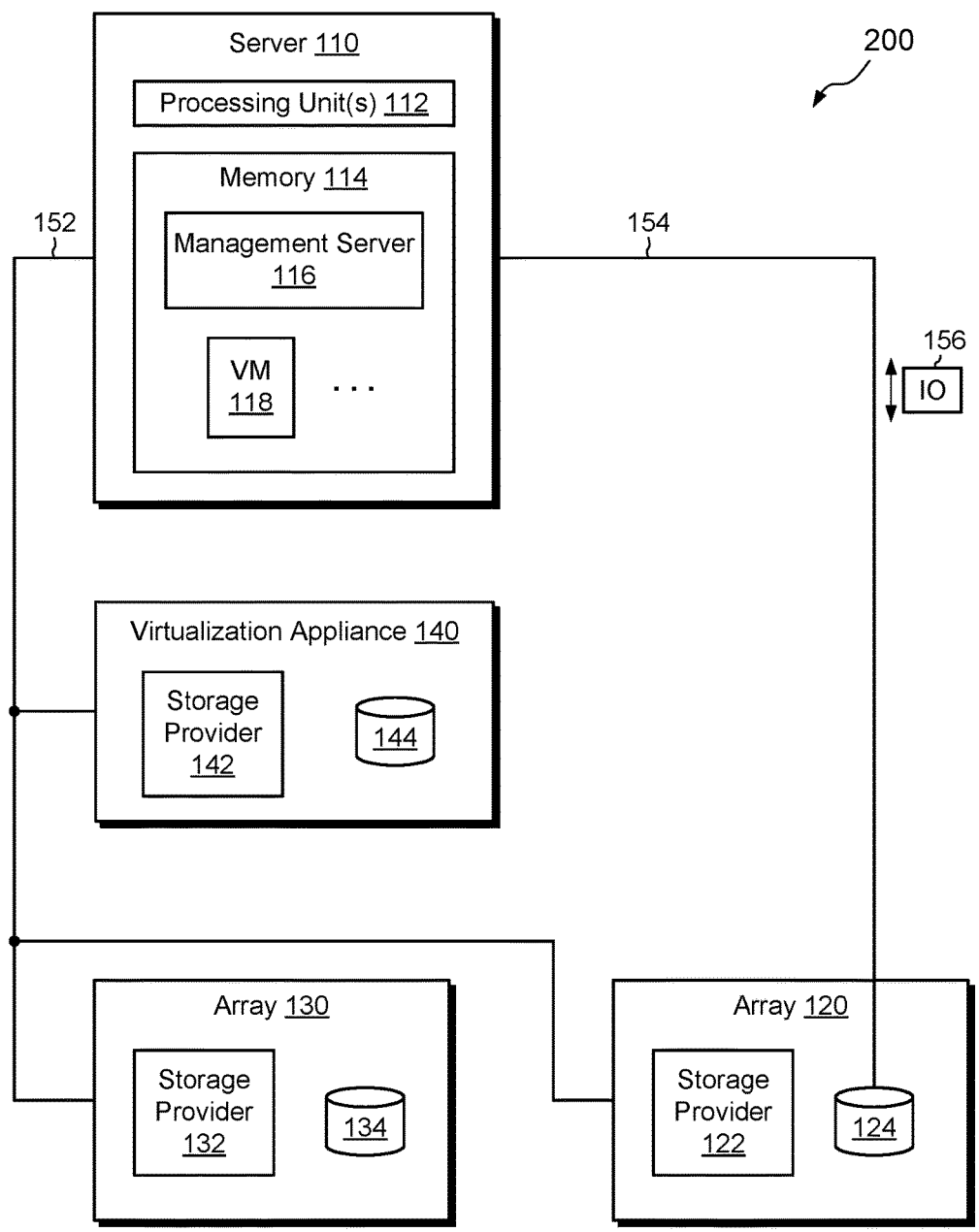
FIGS. 2-5 are a sequence of block diagrams showing an example arrangement for migrating a virtual disk from a first storage array to a second storage array.

FIG. 2 shows an example arrangement 200 for preparing migration. Here, the administrator may physically configure a second array 130 (e.g., a new array), by providing it with power, cabling, and configuration settings. In some examples, the second array 130 may be placed near the first array 120, e.g., in the same data center; however, this is not required. The administrator may also insert and configure a virtualization appliance 140. In the example shown, the virtualization appliance 140 is provided as a distinct hardware unit, separate from the arrays 120 and 130 and separate from the server 110. In some examples, multiple hardware units may be included, e.g., for redundancy. In further examples, the virtualization appliance 140 may be provided in the form of software components that run on the arrays 120 and 130, e.g., with one or more software components per array. The software components that make up the virtualization appliance 140 may be run directly on the arrays 120 and/or 130, and/or on one or more virtual machines. Such virtual machines may be run within one or both arrays 120 and 130 and/or within one or more separate servers. Further still, some implementations may involve using combinations of one or more hardware units and one or more software components (e.g., as virtual machines or otherwise); there is no need for all components of the virtualization appliance 140 to be of the same type. In a particular, non-limiting example, the virtualization appliance 140 may be realized with commercially-available storage virtualization products, such as with the VPLEX family of virtualization systems, available from EMC Corporation of Hopkinton, Mass.

In some examples, configuring the second array 130 includes running a storage provider 132 in the second array 130, such that the storage provider 132 is connected to the control path 152. Likewise, configuring the virtualization appliance 140 may include running a storage provider 142, such that the storage provider 142 is also connected to the control path 152. The storage providers 132 and 142 are similar to the storage provider 122 but may be specifically tailored for interacting with the respective equipment and software environments of the second array 130 and virtualization appliance 140. In some examples, multiple instances of the control path 152 may be created, such as one instance per storage provider 122, 132, and 142. Only a single instance is shown for simplicity. Further, multiple instances may be provided for any of the storage providers 122, 132, and/or 142 itself, e.g., for high availability.

In some examples, preparation for migration may further include creating a pool of free virtual disks on the array 130 and creating a pool of free virtual disks on the virtualization appliance 140. The pool of virtual disks on the array 130 may include a virtual disk 134. Likewise, the pool of virtual disks on the virtualization appliance 140 may include a virtual disk 144. The virtual disks 134 and 144 may initially be empty. The storage providers 132 and 142 discover the virtual disks 134 and 144, respectively, and communicate information about them to the server 110 and to the management server 116 over the control path 152.

Also at this time, the virtualization appliance 140 may be configured to virtualize the virtual disks 124 and 134 and to present a single image of both in the form of virtual disk 144.

It should be understood that the virtual machine 118 may continue to operate during this preparation phase, and thus may continue to issue IO requests 156 to the virtual disk 124 in the first array 120. Preparation for migration thus requires no disruption in service to users of VM 118.

Figure 3:
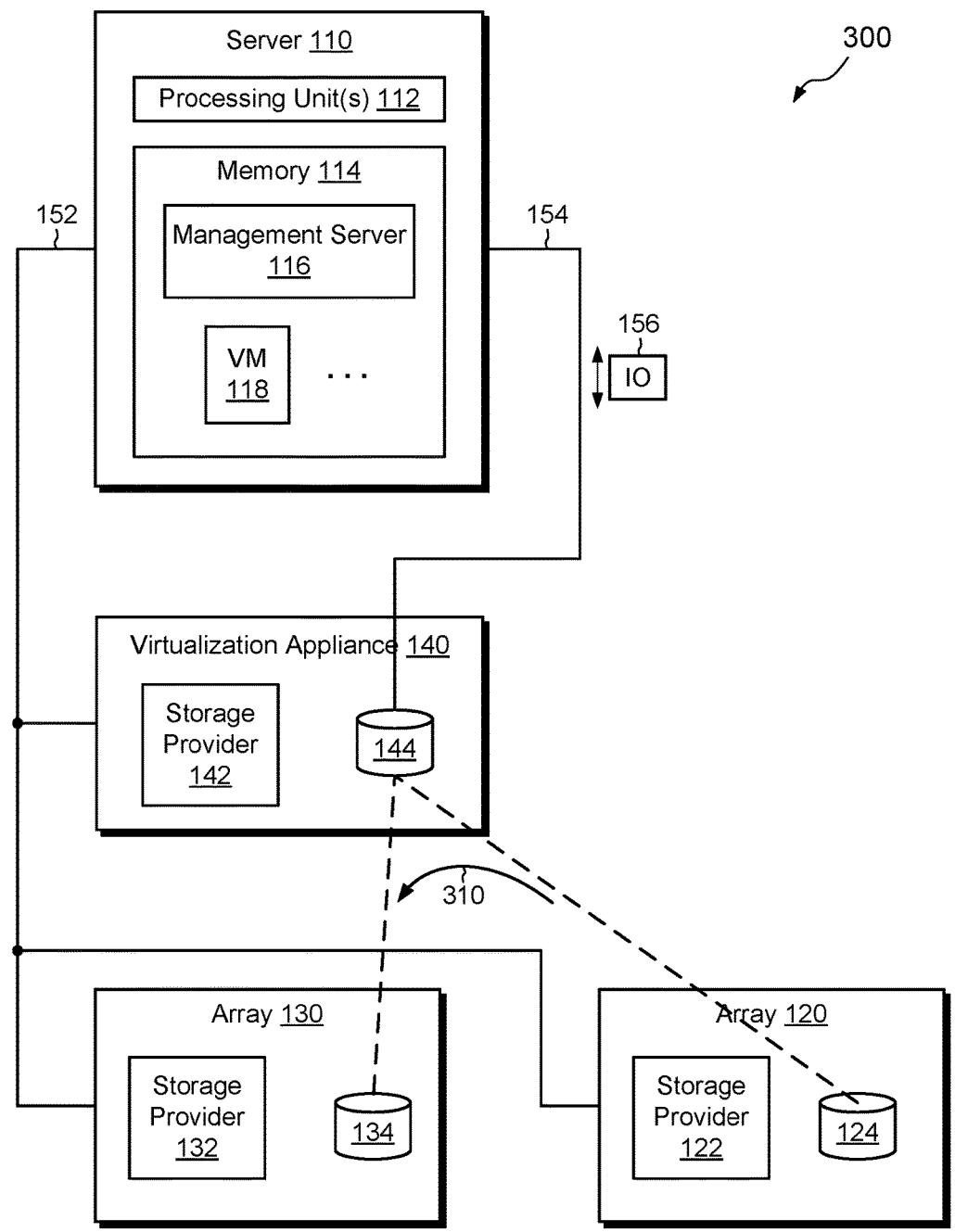

FIG. 3 shows an example arrangement 300 for performing a first migration operation of virtual disk 124. In an example, the management server 116 drives this migration operation, e.g., by executing a predefined workflow. Here, the virtual appliance 140 is inserted into the data path 154 by redirecting IO requests 156 from the virtual disk 124 in the array 120 to the virtual disk 144 in the virtualization appliance 140. Redirection may be achieved, for example, by the management server 116 instructing the server 110 to change the address to which the IO requests 156 on behalf of VM 118 are sent, i.e., from an address of the virtual disk 124 to an address of the virtual disk 144. In an example, this redirection takes place transparently to the VM 118 and to any application running thereon. Thus, preparation of the virtual disk 144 via the control path 152 enables a seamless transition of IO requests 156 from virtual disk 124 to virtual disk 144 without disruption to users.

In a particular, non-limiting example, the workflow driving this first migration operation employs a modified version of a process for enabling long-distance movement of virtual machine storage. For example, VMware provides a process called "Replication Assisted vMotion, which is designed to move storage for virtual machines over long distances using a replication transport. In an example, this Replication Assisted vMotion process may be modified for use with the virtualization appliance 140 herein in place of a replication transport. This is merely an example, however.

Once redirection has taken place, IO requests 156, which previously were directed to virtual disk 124, are instead directed to virtual disk 144, and the virtualization appliance 140 effects mirroring between virtual disks 124 and 134 in the background. For example, the virtualization appliance 140 begins a bulk copy 310 of data from the virtual disk 124 to the virtual disk 134. The virtualization appliance 140 also mirrors any writes specified in newly arriving IO requests 156 to both virtual disks 124 and 134. After some time has passed, the bulk copy 310 completes. Although writes continue to arrive, the contents of virtual disks 124 and 134 become synchronized, with each of the virtual disk 124 and 134 providing a consistent, coherent mirror of the other.

If desired, migration may conclude at this point, or at least may be maintained in this state for some period of time. For example, the virtual appliance 140 may continue to operate and the array 120 may remain connected to promote high availability and/or redundancy. More typically, however, migration will proceed to the arrangement shown in FIG. 4.

Figure 4:
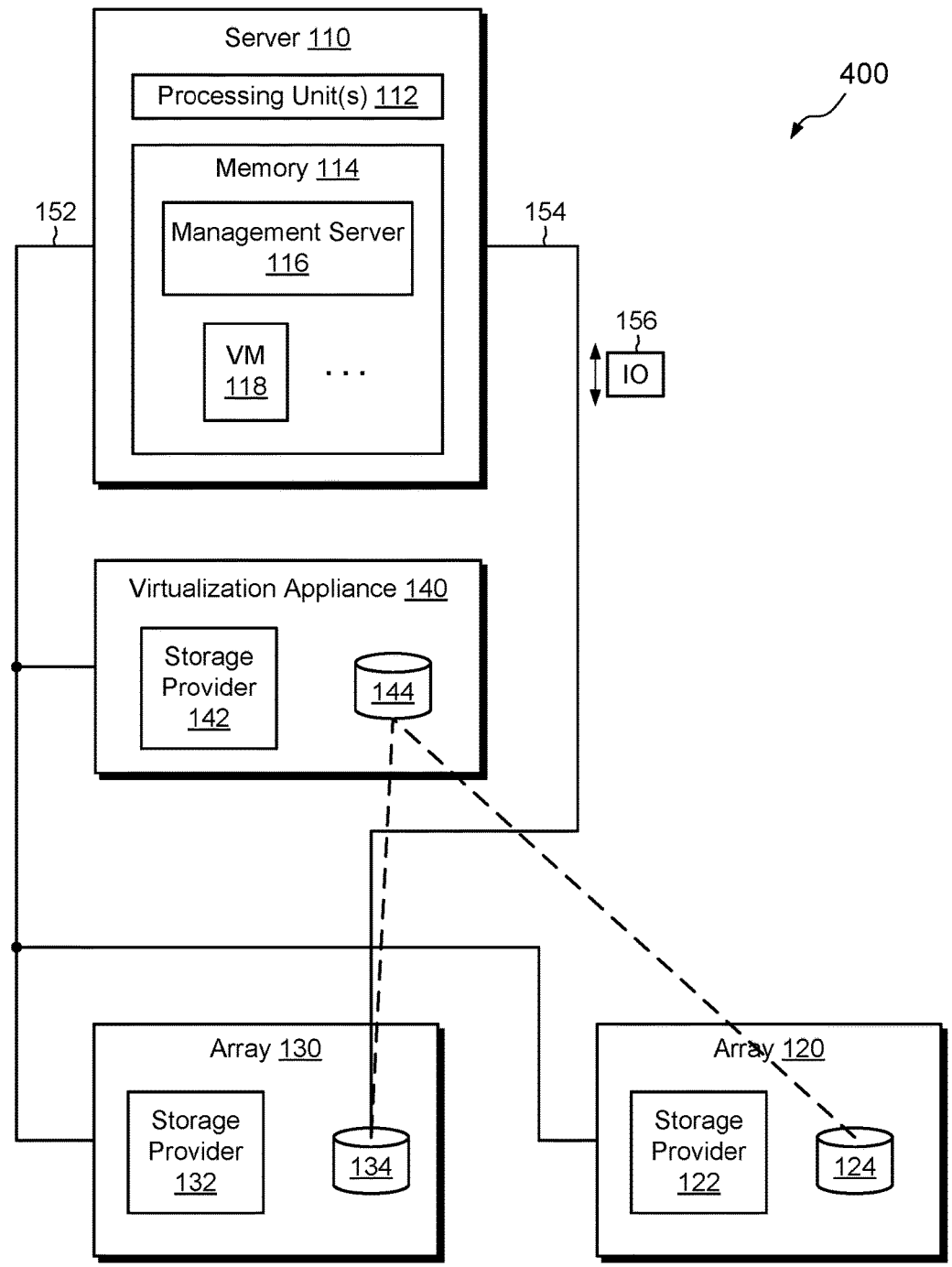

FIG. 4 shows an example arrangement 400 for performing a second migration operation of virtual disk 124. In an example, the management server 116 drives this migration operation, e.g., by executing a predefined workflow. During this second migration operation, IO requests 156 are redirected from the virtual disk 144 in the virtualization appliance 140 to the virtual disk 134 in the array 130. Redirection may be achieved in a manner similar to that described above, e.g., by the management server 116 directing the server 110 the change the address to which the IO requests 156 on behalf of VM 118 are sent, i.e., from an address of the virtual disk 144 to an address of the virtual disk 134. As before, some example embodiments may leverage Replication Assisted vMotion technology. Once again, redirection takes place transparently to the VM 118 or to any application running thereon, with preparation of the virtual disk 134 via the control path 152 enabling a seamless and non-disruptive transition of IO requests 156 from virtual disk 144 to virtual disk 134.

Figure 5:
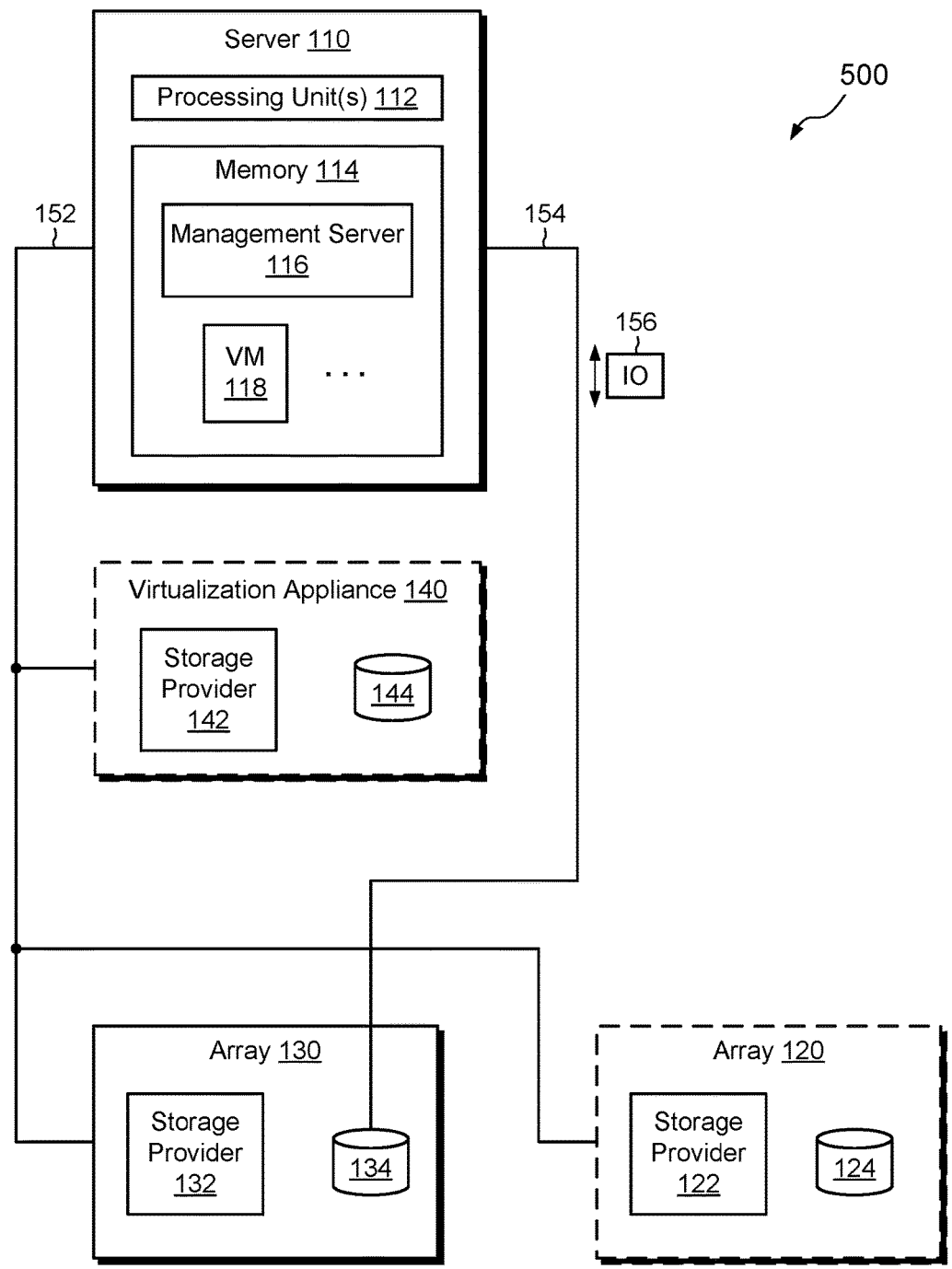

FIG. 5 shows an example arrangement 500 after completion of both the first migration operation and the second migration operation. Here, migration of the virtual disk 124 is complete. If desired, the virtualization appliance 140 may be disabled or removed from the configuration. Also, the array 120 may be disabled or removed from the configuration. In some examples, the array 120 may continue to operate, e.g., for other purposes, or it may be brought out of service.

Figure 6:
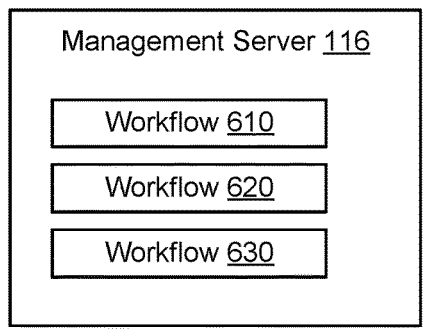
FIG. 6 is a block diagram showing an example management server of FIGS. 1-5 in greater detail.

FIG. 6 shows an example arrangement of workflows that may be operated by the management server 116. As stated previously, the management server 116 may achieve the first and second migration operations by running workflows. For example, workflow 610 may contain instructions for orchestrating the first migration operation, which involves redirecting IO requests 156 from the virtual disk 124 in array 120 to the virtual disk 144 in the virtualization appliance 140. Similarly, workflow 620 may contain instructions for orchestrating the second migration operation, which involves redirecting IO requests 156 from the virtual disk 144 in the virtualization appliance 140 to the virtual disk 134 in array 130. In some examples, the workflows 610 and 620 are modified versions of Replication Assisted vMotion workflows, which are designed for use with a replication transport; however, this is not required. For example, the workflows 610 and 620 may be provided as modified forms of any existing storage vMotion workflows, including those for shared storage and/or non-shared storage. Further, the workflows 610 and 620 may be provided as other workflows or developed as original workflows without direct inclusion or reference to existing workflows. The workflows 610 and 620 may be provided as pre-programmed workflows, which an administrator may run from a client of the management server 116 (e.g., a web client or client application, not shown), e.g., by entering configuration-specific information, such as names and/or addresses of virtual disks to be moved, addresses of the arrays 120 and 130, and an address of the virtualization appliance 140. Alternatively, the workflows 610 and 620 may be designed by the administrator or some other person, e.g., using a workflow creation tool.

In addition to migrating virtual disks, an administrator may wish to migrate the processing of a virtual machine, as well. Thus, for example, a workflow 630 may be provided for moving the processing of VM 118 to a different physical server. Such migration may be performed for load balancing, to enable maintenance of server 110, to locate the processing of VM 118 closer to the storage for VM 118, or for any reason. Such VM migration may be performed independently of the storage migration described above or may accompany such storage migration.

Figure 7:
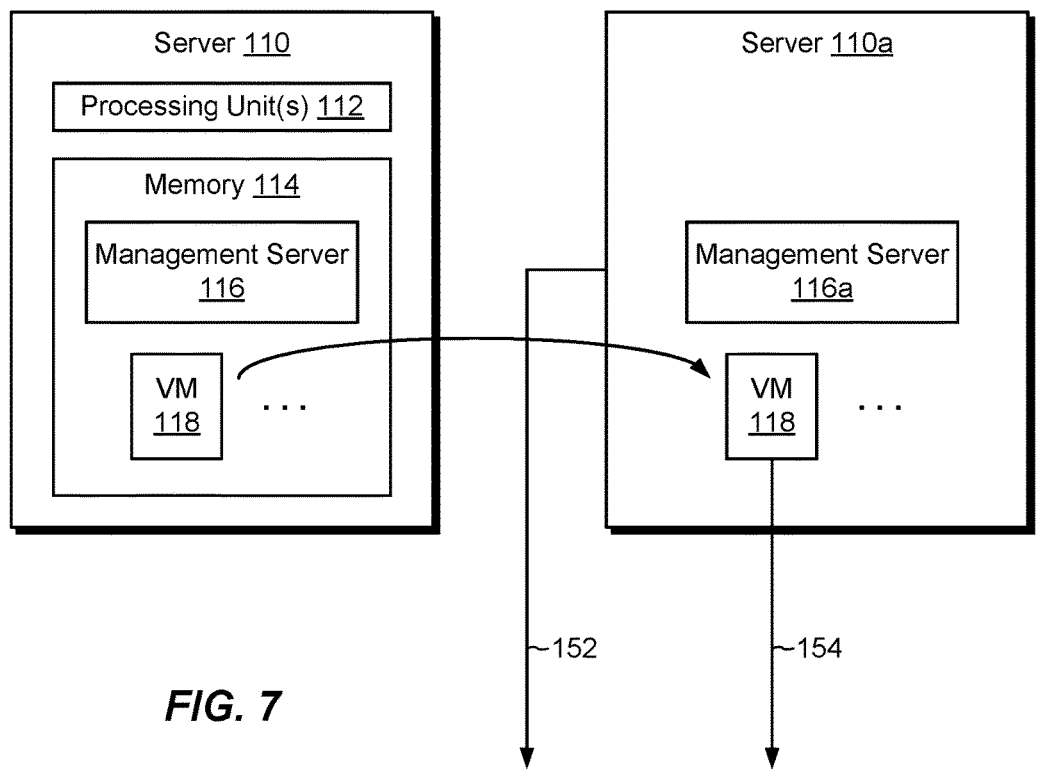
FIG. 7 is a block diagram showing an example arrangement for migrating the processing of a virtual machine from one server to another.

FIG. 7 shows an example arrangement for performing such VM migration. Here, the processing of VM 118 may be migrated from server 110 to server 110a. Server 110a may be configured similarly to server 110, although this is not required. Migration of the VM 118 from server 110 to server 110a may be conducted using well-known techniques for live migration of virtual machines, which may entail, for example, synchronizing the memory state of VM 118 on server 110 with that of VM 118 on server 110a. The memory state may reside in physical memory or in disk-based swap storage, for example. In the context of the storage migration described herein, migrating the VM 118 may further include configuring the server 110a to connect to both the control path 152 and the data path 154, to enable communication with providers 122, 132, and/or 142 and with management server 116, and to enable IO requests 156 to follow the same paths as described above.

Upon completion of the VM migration described in connection with FIG. 7, the administrator may choose to reassign management responsibilities for VM 118 to a new management server 116a running in server 110a. Such reassignment may be desirable when arrays 120 and 130 are located in physically distinct datacenters, and the domain of administration and management is contained within a building or facility.

Figure 8:
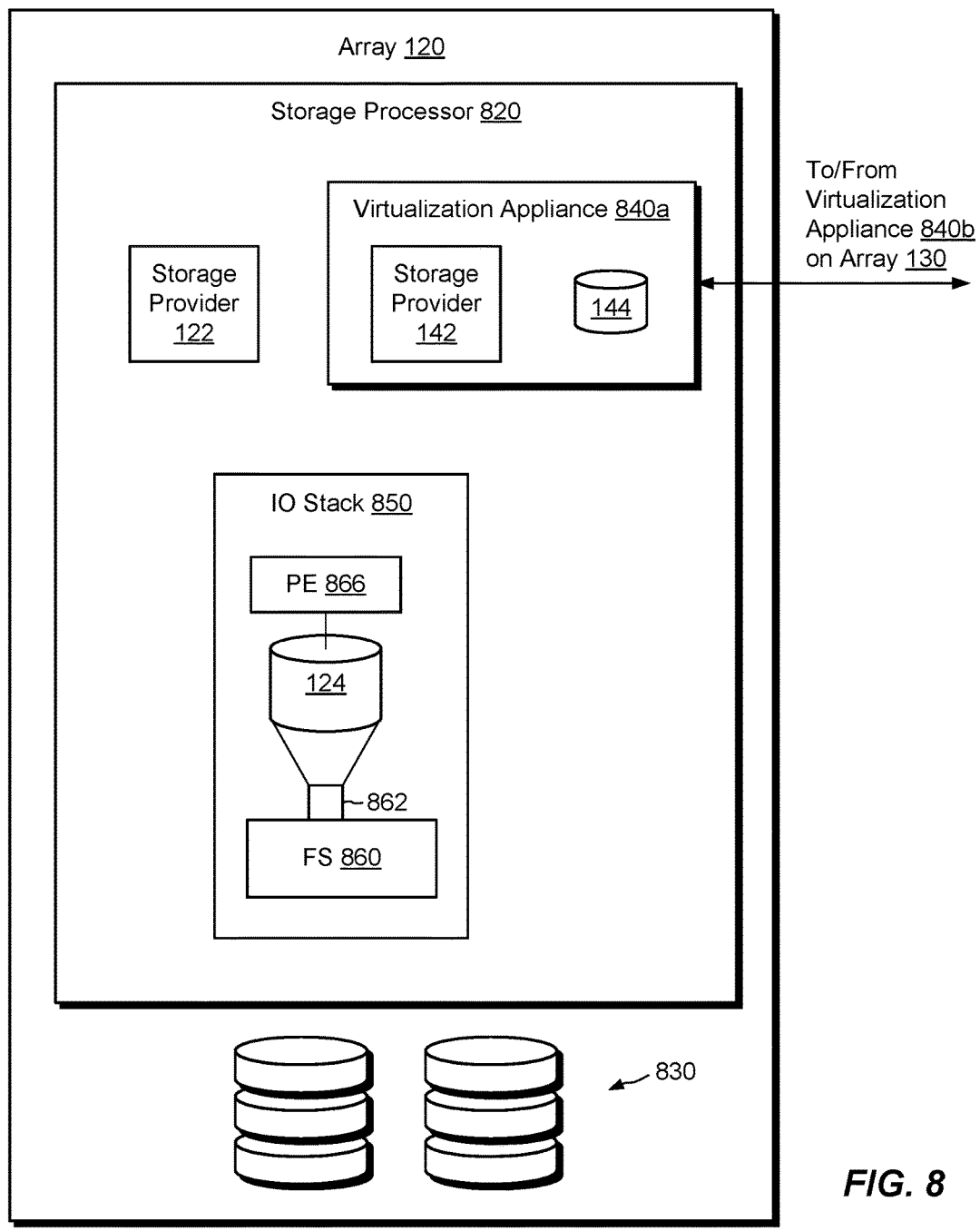
FIG. 8 is a block diagram showing an example storage array of FIGS. 1-5 in greater detail.

FIG. 8 shows an example of the array 120 in greater detail. The arrangement shown is intended to be representative of both arrays 120 and 130, with the understanding that the two arrays 120 and 130 may differ in their particular details.

Here, it is seen that the array 120 includes a storage processor (SP) 820 and storage 830. The array 120 may include multiple SPs like the SP 820. The storage 830 includes multiple storage drives, such as magnetic disk drives, electronic flash drives, optical drives, and/or other types of drives. Although not shown, it is understood that the SP 820 includes one or more processors (e.g., chips, cores, assemblies, etc.) and memory. The memory stores executable instructions and data, which, when run by the processors, realize the software constructs as shown. These constructs include, for example, the above-mentioned storage provider 122 and an IO stack 850.

The IO stack 850 provides an execution path for IO requests 156 within the array 120. Here, it is seen that the virtual disk 124 (FIGS. 1-5) is served from a file 862 of a file system 860. A protocol endpoint 866 exposes the virtual disk 124 to hosts, such as the server 110, and allows such hosts to read and write the virtual disk 124.

In an example, the file system 860 is an internal, private file system, which is built upon the storage 830. The file 862 is a file within the file system 860 and provides a complete realization of the virtual disk 124, including all of its data and any metadata. Thus, for example, in operation, the IO stack 850 translates reads and writes issued to the virtual disk 124, i.e., specified by IO requests 156, into corresponding reads and writes of the file 862. Although the file system 860 is private and thus hidden from the server 110, the file 862 within the file system 860 is exposed and made accessible to the server 110 via the protocol endpoint 866.

As stated previously, in some examples the virtual disk 124 is directly accessible to the server 110 without having to traverse any containing structure, such as a LUN or a file system. The server 110 can thus access the virtual disk 124 directly as a distinct object via the protocol endpoint 866. In an example, the server 110 has no ability to access the file system 860, which is hidden, internal, and provided for internal data management. Further, it should be understood that the array 120 may host any number of virtual disks, like the virtual disk 124. In some examples, different virtual disks are provided as respective files (like file 862) in respective internal file systems (like file system 860).

As further shown in FIG. 8, the SP 820 also operates a virtualization appliance component 840a. In this arrangement, a storage processor on array 130 may store a complementary virtualization appliance component 840b. The two virtualization appliance components 840a and 840b work in close coordination to provide, in software form, the functionality of the virtual appliance (or appliances) 140 described above. In this arrangement, the storage provider 142 need be provided in only one virtualization appliance component (here, 840a). The storage provider 142 connects to the control path 152 in the same manner described above. It should be appreciated that the virtualization appliance(s) may alternatively be provided as one or more hardware unit, as one or more virtual machines, or otherwise as indicated in the examples provided above in connection with FIG. 2.

Figure 9:
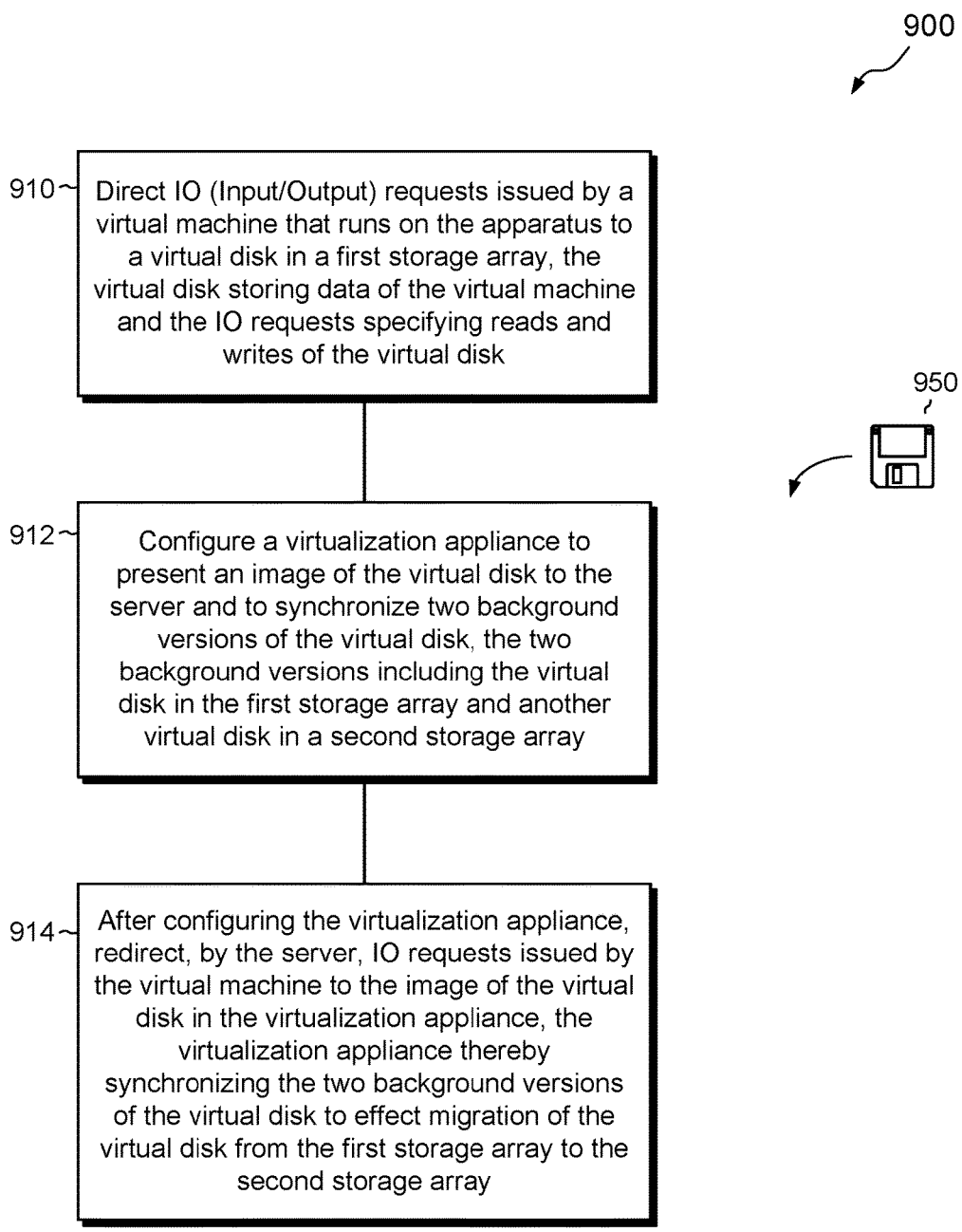
FIG. 9 is a flowchart showing an example method of migrating virtual disks between storage arrays.

FIG. 9 shows an example method 900 of migrating virtual machine disks between storage arrays. The method 900 may be carried out in connection with the environment shown in FIGS. 1-5 and may be performed by the software constructs, described in connection with FIG. 1, which reside in the memory 114 of the server 110 and are run by the set of processing units 112. The various acts of the method 900 may be ordered in any suitable way. Accordingly, embodiments may be constructed in which acts are performed in orders different from those illustrated, which may include performing some acts simultaneously, even though the acts are shown as sequential in the illustrated embodiments.

At 910, IO (Input/Output) requests issued by a virtual machine that runs on the apparatus are directed to a virtual disk in a first storage array. The virtual disk stores data of the virtual machine, and the IO requests specify reads and writes of the virtual disk. For example, as shown in FIG. 1, IO requests 156 issued by VM 118 are directed to virtual disk 124 in array 120. The virtual disk 124 stores data of the virtual machine 118, such as operating system data, user data, application data, configuration data, swap space data, and so forth. The IO requests 156 specify reads and writes of the virtual disk 124.

At 912, a virtualization appliance is configured to present an image of the virtual disk to the server and to synchronize two background versions of the virtual disk. The two background versions include the virtual disk in the first storage array and another virtual disk in a second storage array. For example, as shown in FIG. 2, virtualization appliance 140 is configured to present a single disk image 144 to the server 110 and to synchronize the two virtual disks 124 and 134 in the background.

At 914, after configuring the virtualization appliance, IO requests issued by the virtual machine are redirected to the image of the virtual disk in the virtualization appliance, the virtualization appliance thereby synchronizing the two background versions of the virtual disk to effect migration of the virtual disk from the first storage array to the second storage array. For example, as shown in FIG. 3, IO requests 156 are redirected to the virtual disk image 144 in the virtualization appliance 140. The virtualization appliance 140 may then synchronize the virtual disks 124 and 134. In some examples, synchronization includes performing a bulk copy 310 of data from virtual disk 124 to virtual disk 134, as well as mirroring any newly arriving writes specified in IO requests 156 to both virtual disks 124 and 134, thus providing consistency and coherence between virtual disks 124 and 134. Once the two virtual disks 124 and 134 are synchronized, migration of virtual disk 124 to virtual disk 134 is considered complete. Optionally, additional acts may follow, which are not shown, such as redirecting IO requests 156 to the virtual disk 134 in array 130, disabling or removing from the configuration the virtualization appliance 140, and/or disabling or removing from the configuration the array 120.

An improved technique has been described for migrating data of a virtual machine 118 from a first storage array 120 to a second storage array 130. The technique includes configuring a virtualization appliance 140 (also 840a and 840b) to mirror data between the first storage array 120 and the second storage array 130 and redirecting IO (Input/Output) requests 156, which were previously directed to the first storage array 120, to the virtualization appliance 140 instead. The virtualization appliance 140 performs data mirroring to bring the data in the second storage array 130 into synchronization with the data in the first storage array 120, such that migration of the data from the first storage array 120 to the second storage array 130 is achieved. In this fashion, the burden of transferring data is shifted from the server 110 to the virtualization appliance 140 and the arrays 120 and 130, thus freeing the server's resources for running virtual machines while more effectively utilizing the capabilities of the appliance and the arrays.

Having described certain embodiments, numerous alternative embodiments or variations can be made. For example, although migration has been described in connection with a single virtual disk 124, it should be understood that any number of virtual disks may be migrated in a similar manner. Also, in some examples, multiple virtual disks may be joined together to form a consistency group, which may be migrated from array 120 to array 130, effectively as a single element. In addition, and along the same lines, virtual disks belonging to multiple virtual machines may be migrated together as one.

Further, although migration hereof has been described in connection with virtual "disks," that term as used herein is intended to include virtual volumes of any kind, with the terms "volumes" and "disks" used interchangeably.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of non-disruptively migrating virtual disks between storage arrays, the method comprising:

directing, by a server that runs a virtual machine, IO (Input/Output) requests issued by the virtual machine to a virtual disk in a first storage array, the virtual disk storing data of the virtual machine and the IO requests specifying reads and writes of the virtual disk;

configuring a virtualization appliance to present an image of the virtual disk to the server and to synchronize two background versions of the virtual disk, the two background versions including the virtual disk in the first storage array and another virtual disk in a second storage array; and after configuring the virtualization appliance, redirecting, by the server, IO requests issued by the virtual machine to the image of the virtual disk in the virtualization appliance, the virtualization appliance thereby synchronizing the two background versions of the virtual disk to effect migration of the virtual disk from the first storage array to the second storage array.

2. The method of claim 1, wherein redirecting IO requests to the virtualization appliance is part of performing a first migration operation, the first migration operation non-disruptively migrating the virtual disk from the first storage array to the virtualization appliance.

3. The method of claim 2, further comprising, after performing the first migration operation, performing a second migration operation, the second migration operation including redirecting, by the server, IO requests issued by the virtual machine to the other virtual disk in the second storage array to non-disruptively migrate the virtual disk from the virtualization appliance to the second storage array.

4. The method of claim 3, wherein the first storage array realizes the virtual disk as an internal file of an internal file system in the first storage array, wherein the virtual disk realized by the internal file is accessible to the server, and wherein the internal file system in which the internal file resides is hidden from the server.

5. The method of claim 3, wherein the first migration operation and the second migration operation are performed under direction of a management server, the management server having a first workflow defined for performing the first migration operation and a second workflow defined for performing the second migration operation.

6. The method of claim 5, further comprising:
the management server coordinating with a storage provider running on the first storage array and with a storage provider running on the virtualization appliance to perform the first migration operation; and
the management server coordinating with a storage provider running on the second storage array and with the storage provider running on the virtualization appliance to perform the second migration operation,
wherein each storage provider includes an API (application programmer interface) for communicating storage information about the storage array or virtualization appliance on which it runs with the management server.

7. The method of claim 6, wherein the virtualization appliance is realized with at least one software component running on the first storage array and with at least one software component running on the second storage array.

8. The method of claim 6, wherein the virtualization appliance is realized as at least one hardware unit distinct from the first storage array and the second storage array but connected to both the first storage array and the second storage array.

9. The method of claim 6, further comprising non-disruptively migrating the virtual machine from the server to a second server, the virtual machine migrated to the second server accessing, as its virtual disk, the other virtual disk on the second storage array.

10. The method of claim 2,
wherein providing synchronization between the two background versions of the virtual disk includes copying data from the virtual disk in the first storage array to the other virtual disk in the second storage array, and
wherein performing the second migration operation is performed after completely copying the data from the virtual disk in the first storage array to the other virtual disk in the second storage array.

11. An apparatus, comprising control circuitry that includes a set of processing units coupled to memory, the control circuitry constructed and arranged to:
direct IO (Input/Output) requests issued by a virtual machine that runs on the apparatus to a virtual disk in a first storage array, the virtual disk storing data of the virtual machine and the IO requests specifying reads and writes of the virtual disk;
configure a virtualization appliance to present an image of the virtual disk to the server and to synchronize two background versions of the virtual disk, the two background versions including the virtual disk in the first storage array and another virtual disk in a second storage array; and
after configuring the virtualization appliance, redirect, by the server, IO requests issued by the virtual machine to the image of the virtual disk in the virtualization appliance, the virtualization appliance thereby synchronizing the two background versions of the virtual disk to effect non-disruptive migration of the virtual disk from the first storage array to the second storage array.

12. The apparatus of claim 11,
wherein the control circuitry, when constructed and arranged to redirect IO requests, is further constructed and arranged to redirect IO requests to the virtualization appliance as part of performing a first migration operation, the first migration operation non-disruptively migrating the virtual disk from the first storage array to the virtualization appliance, and wherein, the control circuitry, after performing the first migration operation, is further constructed and arranged to perform a second migration operation, the second migration operation including redirecting, by the server, IO requests issued by the virtual machine to the other virtual disk in the second storage array to non-disruptively migrate the virtual disk from the virtualization appliance to the second storage array.

13. A computer program product including a set of non-transitory, computer-readable media having instructions which, when executed by control circuitry of a server, cause the control circuitry to perform a method for non-disruptively migrating virtual disks between storage arrays, the method comprising:
directing, by the server, IO (Input/Output) requests issued by a virtual machine that runs on the server to a virtual disk in a first storage array, the virtual disk storing data of the virtual machine and the IO requests specifying reads and writes of the virtual disk;
configuring a virtualization appliance to present an image of the virtual disk to the server and to synchronize two background versions of the virtual disk, the two background versions including the virtual disk in the first storage array and another virtual disk in a second storage array; and after configuring the virtualization appliance, redirecting, by the server, IO requests issued by the virtual machine to the image of the virtual disk in the virtualization appliance, the virtualization appliance thereby synchronizing the two background versions of the virtual disk to effect migration of the virtual disk from the first storage array to the second storage array.

14. The computer program product of claim 13, wherein the method further comprises the first storage array realizing the virtual disk as an internal file of an internal file system in the first storage array, wherein the virtual disk realized by the internal file is accessible to the server, and wherein the internal file system in which the internal file resides is hidden from the server.

15. The computer program product of claim 13,
wherein redirecting IO requests to the virtualization appliance is part of a first migration operation, the first migration operation non-disruptively migrating the virtual disk from the first storage array to the virtualization appliance, and
wherein the method further comprises, after performing the first migration operation, performing a second migration operation, the second migration operation including redirecting, by the server, IO requests issued by the virtual machine to the other virtual disk in the second storage array to non-disruptively migrate the virtual disk from the virtualization appliance to the second storage array.

16. The computer program product of claim 15, wherein the first migration operation and the second migration operation are performed under direction of a management server, the management server having a first workflow defined for performing the first migration operation and a second workflow defined for performing the second migration operation.

17. The computer program product of claim 16, wherein the method further comprises:
the management server coordinating with a storage provider running on the first storage array and with a storage provider running on the virtualization appliance to perform the first migration operation; and
the management server coordinating with a storage provider running on the second storage array and with the storage provider running on the virtualization appliance to perform the second migration operation,
wherein each storage provider includes an API (application programmer interface) for communicating storage information about the storage array or virtualization appliance on which it runs with the management server.

18. The computer program product of claim 17, wherein the virtualization appliance is realized with at least one software component running on the first storage array and with at least one software component running on the second storage array.

19. The computer program product of claim 17, wherein the virtualization appliance is realized as at least one hardware unit distinct from the first storage array and the second storage array but connected to both the first storage array and the second storage array.

20. The computer program product of claim 17, wherein the method further comprises non-disruptively migrating the virtual machine from the server to a second server, the virtual machine migrated to the second server accessing, as its virtual disk, the other virtual disk on the second storage array.

21. The method of claim 2, wherein the image of the virtual disk presented by the virtualization appliance is itself a virtual disk.

\* \* \* \* \*